United States Patent [19]

Lew et al.

[11] Patent Number: 5,450,760
[45] Date of Patent: Sep. 19, 1995

[54] TURBINE FLOWMETER WITH CAPACITIVE TRANSDUCER

[76] Inventors: Hyok S. Lew; Yon S. Lew; Yon K. Lew, all of 7890 Oak St., Arvada, Colo. 80005

[21] Appl. No.: 172,767

[22] Filed: Dec. 27, 1993

Related U.S. Application Data

[63] Continuation-in-part of Ser. No. 137,560, Nov. 5, 1993.
[51] Int. Cl.$^6$ .................... G01F 15/00; G01F 1/86; G01F 15/02
[52] U.S. Cl. .................... 73/861.77; 73/861.02
[58] Field of Search ........... 73/861.03, 861.77, 861.78, 73/861.02; 324/166

[56] References Cited

U.S. PATENT DOCUMENTS

| | | | |
|---|---|---|---|
| 3,208,269 | 9/1965 | Eccles et al. | 73/861.77 X |
| 3,241,367 | 3/1966 | Moss et al. | 73/861.03 |
| 3,407,657 | 10/1968 | Maurer | 73/861.03 X |
| 3,958,447 | 5/1976 | Baker et al. | 73/861.02 X |
| 4,164,866 | 8/1979 | Mitchell et al. | 73/861.77 |
| 4,324,144 | 4/1982 | Miyata et al. | 73/861.77 |
| 4,404,860 | 9/1983 | Wood et al. | 73/861.78 |
| 4,482,859 | 11/1984 | Fournier | 324/166 |

FOREIGN PATENT DOCUMENTS

| | | | |
|---|---|---|---|
| 897750 | 5/1962 | United Kingdom | 73/861.36 |
| 504088 | 2/1976 | U.S.S.R. | 73/861.77 |

*Primary Examiner*—Richard E. Chilcot, Jr.
*Assistant Examiner*—William L. Oen

[57] ABSTRACT

A turbine flowmeter employs a capacitive rotary speed sensor comprising an electrically conductive member with a sizable surface area kinematically coupled to the rotating motion of the turbine, and a pair of stationary electrically conductive members with a sizable area disposed in a side-by-side electrically nonconducting relationship therebetween on a plane closely adjacent to a plane defined by the sizable surface area of the electrically conductive member kinematically coupled to the rotating motion of the turbine, wherein a first alternating electrical signal is supplied to one of the pair of stationary electrically conductive members and a second alternating electrical signal is taken off from the other of the pair of stationary electrically conductive members, and the flow rate of fluid is determined as a function of the frequency of fluctuation of an envelope of the second alternating electrical signal.

14 Claims, 4 Drawing Sheets

TURBINE FLOWMETER WITH CAPACITIVE TRANSDUCER

This is a Continuation-In-Part to copending Patent application Ser. No. 08/137,560 entitled "Turbine Flowmeter with Capacitive Transducer" filed on Nov. 5, 1993.

FIELD OF INVENTION

This invention relates to a flowmeter comprising at least one rotating and nonrotating turbine with capacitive transducers remotely and automatically providing electronic data on the rotary speed of the rotating turbine and the rotary position of the nonrotating turbine, wherein the volume flow rate of media moving through the rotating turbine is determined as a function of the rotary speed of the rotating turbine and the dynamic pressure of the media flow is determined as a function of the rotary position of the nonrotating turbine, and the mass flow rate of the media is determined as a function of the rotary speed of the rotating turbine and the rotary position of the nonrotating turbine.

BACKGROUND OF INVENTION

With few exceptions, the conventional turbine, paddle, propeller or screw flowmeters employ a magnetic induction or magnetic reluctance transducer in measuring the rotary speed of the rotary members rotated by the fluid dynamic torque exerted thereon by the media flow, which types of transducers are less than desirable because these conventional transducers require a permanent magnet that limits the high temperature applications of the flowmeters beyond the Curie temperature, provide a very weak electrical signal at low velocities of the media, inhibit the start of the rotation of the rotary member under the fluid dynamic torque due to the magnetic force exerted on the rotary member by the permanent magnet included in the transducer, and the transducer cannot be packaged into a thin streamlined structure such as a shroud, tip of blade or hub of the rotary member rotated by the fluid dynamic torque due to the bulk and mass of the permanent magnet or a ferromagnetic element required to construct the transducer. A nonrotating turbine or propeller can be disposed pivotally about an axis of pivot and provided with a bias torque countering the fluid dynamic torque exerted on the nonrotaing turbine or propeller by the media flow, wherein the dynamic pressure of the media flow is determined as a function of the rotary position of the nonrotating turbine or propeller. At the present time, the nonrotating turbine or propeller flowmeter measuring the rotary position of the turbine or propeller and determining the dynamic pressure of the media flow as a function of the rotary position of the turbine or propeller has not been put into the practice.

BRIEF SUMMARY OF INVENTION

The primary object of the present invention is to provide a rotating turbine, paddle, propeller or screw flowmeter, that employs a capacitive rotary speed sensor providing an alternating electrical signal with a frequency directly proportional to the rate of rotation of the rotary member being rotated by the fluid dynamic torque exerted by the flowing media.

Another object is to provide the capacitive rotary speed sensor described in the afore-mentioned primary object of the present invention, that comprises a pair of discrete electrical capacitive members made of an electrically conductive material and disposed in a stationary state, which is disposed on a surface closely adjacent to a surface defined by a discrete electrical capacitive member affixed to the rotary member, wherein each of the electrical capacitive members has a sizable surface area that establishes an intermittent close surface-to-surface proximity relationship between the pair of stationary capacitive members and the rotating capacitive member during the rotation of the rotary member. A first alternating electrical signal is supplied to one of the pair of stationary capacitive members and a second alternating electrical signal is taken off from the other of the pair of stationary capacitive elements, and the rate of rotation of the rotary member is determined as a function of the frequency of fluctuation of the envelope of the second alternating electrical signal.

A further object is to provide the capacitive rotary speed sensor described in the afore-mentioned primary object of the present invention, that comprises a pair of stationary capacitive members with a sizable surface area disposed tangentially on a surface defined by a rotary conductive member with a sizable surface area affixed to the rotary member, wherein the sizable surface areas of the stationary capacitive members and the sizable surface area of the rotary capacitor member intermittently establishes a close surface-to-surface proximity relationship therebetween during the rotation of the rotary member. One of the pair of stationary capacitive members is grounded, and the other of the pair of stationary capacitive members is electrically connected to to an amplifier or amplifier/filter that provides an alternating electrical signal with a frequency proportional to the rotating speed of the rotary member.

Yet another object is to provide a simplified version of the capacitive rotary speed sensor described in the afore-mentioned a further object of the present invention, wherein the ground one of the pair of stationary capacitive members is omitted.

Yet a further object is to provide a nonrotating turbine or propeller flowmeter comprising an elongated fluid dynamic body disposed pivotally about a pivot axis and provided with a bias torque countering the fluid dynamic torque exerted on the elongated fluid dynamic body by the flowing media, which fluid dynamic torque tends to pivot the elongated fluid dynamic body about the pivot axis, wherein a capacitive rotary position sensor measures the rotary position of the elongated fluid dynamic body about the pivot axis, and a data processor determines the dynamic pressure of the media flow, which is equal to one half of the media density times the square of the media velocity, as a function of the rotary position of the elongated fluid dynamic body that may be a single or a plurality of blades having a cross sectional geometry of an airfoil and radially extending from the pivot axis, or a turbine or a propeller having a nonzero pitch angle.

Still another object is to provide the capacitive rotary position sensor described in the afore-mentioned yet a further object of the present invention, that comprises a pair of stationary electrically conductive elongated members with a sizable surface area disposed in a side-by-side parallel relationship circumferentially on a circular cylindrical surface coaxial and closely adjacent to another circular cylindrical surface defined by a surface of a pivoting electrically conductive discrete member with a sizable surface area affixed to the radial edge or other part of the elongated fluid dynamic body or to a rotary member kinematically coupled to the pivoting motion of the elongated fluid dynamic body, wherein the sizable surface area of the pivoting electrically conductive discrete member and the sizable surface areas of the pair of stationary electrically conductive elongated members maintain a close surface-to-surface proximity relationship therebetween at all phases of pivoting movement of the elongated fluid dynamic body. An alternating electrical signal is supplied to one or both of the two opposite extremities of the first of the pair of stationary electrically conductive elongated members, and a phase angle difference between two alternating electrical signals respectively taken off from the two opposite extremities of the second of the pair of stationary electrically conductive elongated members is measured. The data processor determining the dynamic pressure of the media flow determines the dynamic pressure of the media flow as a function of the measured phase angle difference between the two alternating electrical signals.

Still a further object is to provide the capacitive rotary position sensor described in the afore-mentioned yet a further object of the present invention, that comprises a single stationary electrically conductive elongated member with a sizable surface area disposed circumferentially on a circular cylindrical surface coaxial and closely adjacent to another circular cylindrical surface defined by a surface of a pivoting electrically conductive discrete member with a sizable surface area affixed to the radial edge or other part of the elongated fluid dynamic body or to a rotary member kinematically coupled to the pivoting motion of the elongated fluid dynamic body, wherein the sizable surface area of the pivoting electrically conductive discrete member and the sizable surface area of the single stationary electrically conductive elongated member maintain a close surface-to-surface proximity relationship therebetween at all phases of the pivoting movement of the elongated fluid dynamic body. An alternating electrical signal is supplied to one of the three elements comprising the pivoting electrically conductive discrete member and the two opposite extremities of the single stationary electrically conductive elongated member, and a phase angle difference between two alternating electrical signals respectively taken off from two of the three elements comprising the pivoting electrically conductive discrete member and the two opposite extremities of the single stationary electrically conductive elongated member is measured. The data processor determining the dynamic pressure of the media flow determines the dynamic pressure of media flow as a function of the rotary position of the elongated fluid dynamic body, which rotary position is determined as a function of the measured phase angle difference between the two alternating electrical signals.

Additional object is to provide a multi-function or compound flowmeter comprising a series combination of a rotating turbine or propeller flowmeter and a nonrotating turbine or propeller flowmeter, wherein the volume flow rate of the media is determined as a function of the rotary speed of the rotating turbine or propeller, and the mass flow rate of the media is determined as a function of the rotary speed of the rotating turbine or propeller and the rotary position of the nonrotating turbine or propeller. The density of the media is determined as a ratio of the mass flow rate to the volume flow rate of the media.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
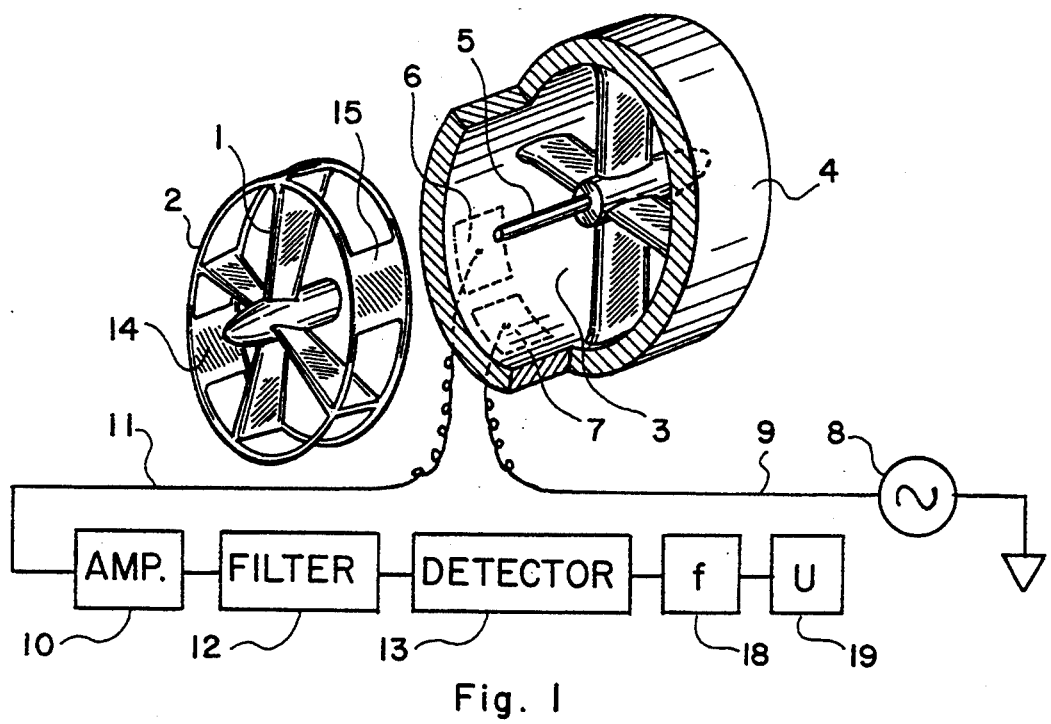
FIG. 1 illustrates an exploded view of an embodiment of the rotating turbine or propeller flowmeter employing a first embodiment of the capacitive rotary speed sensor of the present invention.

In FIG. 1 there is illustrated an exploded view of an embodiment of the rotating turbine or propeller flowmeter employing an embodiment of the capacitive rotary speed sensor of the present invention. A turbine or propeller 1 with a shroud 2 of a circular cylindrical shell geometry is disposed rotatably in a flow passage 3 provided by a conduit 4, wherein the turbine or propeller 1 is supported by a shaft 5 in a freely rotatable arrangement. This combination of the turbine or propeller 1 and the conduit 4 works best when the flow passage 3 has a circular cross section and the turbine or propeller 1 is coaxially disposed in the flow passage 3 in such a way that the gap between the shroud 2 or the radial edge of the turbine or propeller 1 and the wall of the flow passage 3 is small. A pair of stationary discrete electrical capacitive members made of an electrically conductive material, each of which discrete electrical capacitive members is constructed in the form of a metallic patch or plate of a sizable and discrete surface area, are embedded in or bonded to a stationary structure such as the wall of the flow passage 4, wherein the pair of patches or plates 6 and 7 are disposed in an electrically nonconducting relationship therebetween at a close proximity to one another on a common circular cylindrical surface coaxial and close to the inner circular cylindrical surface of the conduit wall. An alternating electrical signal generator 8 supplies an alternating electrical signal oscillating at a frequency of the order of kilo-Hertz or higher to one of the pair of patches or plates 6 and 7 through a lead wire 9 connected to that patch or plate. The other of the pair of patches or plates 6 and 7 is connected to an amplifier 10 by a lead wire 11. The alternating electrical signal amplified by the amplifier 10 is conditioned by an electronic filter 12. A detector 13 eliminates the alternating electrical signal playing the role of a carrier signal and transmits therethrough only the envelope of the alternating electrical signal, wherein the dc component included in the envelope signal is eliminated by the detector 13. The shroud 2 of the turbine or propeller 1 comprises cut-outs and thin structural elements having a negligibly small value of the electric capacitance, and two electrically conductive discrete thin members 14 and 15 having a sizable surface area and a sizable value of the electric capacitance, which thin members 14 and 15 are disposed on a circular cylindrical surface approximately coaxial and substantially close to the inner circular cylindrical surface of the conduit wall in a diametrically opposite relationship therebetween. This particular illustrative embodiment of the construction of the shrouded turbine or propeller 1 is for an all metal construction, wherein each revolution of the turbine or propeller 1 generates two peaks in the envelope of the alternating electrical signal. In alternative designs, the turbine or propeller may have a shroud of solid circular cylindrical shell geometry without any cut-outs made of a dielectric material such as a plastic or ceramic matter and one or more metallic patches or plates may be embedded in or bonded to the shroud, or the turbine or propeller may have one or more thin metallic plates disposed tangentially to the inner circular cylindrical wall of the conduit wall and respectively affixed to the tips of the individual blades of the turbine or propeller as exemplified by the turbines or propellers included in the embodiment shown in FIG. 15. It should be understood that the conduit wall 4 or at least a portion thereof adjacent to the pair of patches or plates 6 and 7 must be made of an electrically nonconducting dielectric material such as a plastic or ceramic matter. During the rotation of the turbine or propeller 1, the sizable surface area of each of the electrically conductive thin members 14 and 15 rotating with the turbine or propeller 1 comes to a close surface-to-surface proximity relationship with the pair of stationary electrically conductive patches or plates 6 and 7 once for every revolution of the turbine or propeller 1. When the electrically conductive thin member 14 or 15 rotating with the turbine or propeller 1 is at a close proximity to the pair of stationary electrically conductive patches or plates 6 and 7, the alternating electrical signal supplied to one of the pair of stationary patches or plates becomes vigorously transmitted to the other of the pair of stationary patches or plates 6 and 7 as a result of the capacitive electrical interaction between the sizable surface area of the electrically conductive thin member 14 or 15 and the sizable surface areas of the pair of stationary patches or plates 6 and 7, and consequently, the envelope of the alternating electrical signal supplied to the amplifier 10 reaches a peak. When neither of the two electrically conductive thin members 14 and 15 rotating with the turbine or propeller 1 is at a close proximity to the pair of stationary patches or plates 6 and 7, the electric circuit between the signal generator 8 and the amplifier 10 lacks the capacitive connection therebetween, and consequently, the envelope of the alternating electrical signal supplied to the amplifier 10 reaches a valley. As a consequence, the envelope of the alternating electrical signal minus the dc component entrained therein, that is provided by the detector 13 oscillates or fluctuates with a frequency equal to the rate of rotation of the turbine or propeller 1 times the number of electrically conductive thin members such as the elements 14 and 15 included in the turbine or propeller 1.

Figure 2:
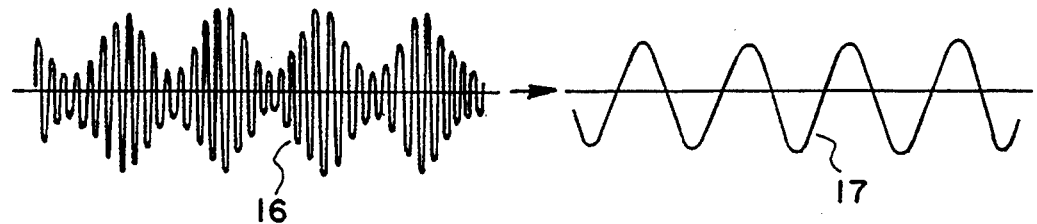
FIG. 2 illustrates an alternating electrical signal provided by the first embodiment of the capacitive rotary speed sensor included in the embodiment shown in FIG. 1, and the envelope of the alternating electrical signal providing the information on the rotary speed of the rotating turbine or propeller.

In FIG. 2 there is illustrated the alternating electrical signal 16 transmitted from the signal generator 8 to the amplifier 10, which has a fluctuating envelope with a frequency equal or proportional to the rate of rotation of the turbine or propeller 1, and the output signal 17 provided by the detector 13, that is the envelope of the alternating electrical signal 16 minus the dc component entrained therein. The frequency of the output alternating electrical signal 17 is equal to the revolutions per unit time of the turbine or propeller times the number of electrically conductive thin members such as the elements 14 and 15 included in the turbine or propeller.

It is well known fact that the fluid dynamic torque $T_U$ received by a rotary member such as the turbine, paddle, propeller, or screw immersed in a stream of the fluid media moving at a velocity U, is proportional to the dynamic pressure of the fluid media, that is equal to one half of the media density $\rho$ times the square of the media velocity U, $$T_U = \frac{C_L}{2} \rho U^2, \quad (1)$$

where $C_L$ is the lift coefficient of the blades of the rotary member. The drag torque $T_D$ experienced by the rotary member rotating at a rotary speed $\Omega$ is given by equation $$T_D = \frac{C_D}{2} \rho \Omega^2, \quad (2)$$

where $C_D$ is the drag coefficient of the blades of the rotary member. At the steady state rotation of the rotary member, the fluid dynamic torque given by equation (1) and the drag torque given by equation (2) are under equilibrium, which condition provides the following equation:

$$U = C\Omega \quad (3)$$

where C is a constant of proportionality defined by equation $$C = \sqrt{C_D/C_L}. \quad (4)$$

Since the rotary speed $\Omega$ is proportional to the frequency f of the output alternating electrical signal provided by the detector 13, equation (3) can be written in the form $$U = \frac{f}{K}, \quad (5)$$

where K is a constant of proportionality to be determined empirically by calibrating the flowmeter, which constant of proportionality is related to the lift and drag coefficients and the number N of the electrically conductive thin members or patches included in the rotary member $$K = \frac{N}{2\pi} \sqrt{\frac{C_L}{C_D}}. \quad (6)$$

The frequency detector 18 included in the embodiment shown in FIG. 1 measure the frequency f of the output alternating electrical signal put out by the detector 13, and the data processor 19 determines the velocity U or the volume flow rate of the media as a function of the measured frequency f by using an empirically obtained mathematical relationship therebetween.

It should be mentioned that the capacitive rotary speed sensor of the present invention shown and described in conjunction with FIGS. 1 and 2 provides a number of advantages over the conventional rotary speed sensor operating on the principles of the magnetic induction or the magnetic reluctance. Firstly, the capacitive rotary speed sensor can be assembled or packaged into a thin streamlined structure as evidenced by the construction thereof shown in FIG. 1, while the conventional speed sensor employing a permanent magnet requires a more bulky packaging. Secondly, the capacitive rotary speed sensor does not exert any force on the rotary member, and consequently, the rotary member starts rotating under a very low fluid dynamic torque, while the permanent magnet included in the conventional rotary speed sensor exerting a magnetic attractive force on one or more blades of the rotary member prevents the rotary member from starting to rotate until the magnitude of the fluid dynamic torque exceeds the magnetic grabbing force exerted by the permanent magnet included in the conventional rotary speed sensor. Thirdly, the capacitive rotary speed sensor gets rid of the limit set by the Curie temperature of the permanent magnet included in the conventional rotary speed sensor in the high temperature applications of the flowmeter, and consequently, a turbine or propeller flowmeter employing the capacitive rotary speed sensor of the present invention made of ceramic and high temperature metallic materials is compatible with many high temperature applications beyond the limit of the conventional turbine or propeller flowmeters. It should be understood that the application of the capacitive rotary speed sensor of the present invention shown and described in conjunction with the turbine or propeller flowmeter shown in FIG. 1 is not limited to the flowmeters employing a turbine, paddle, propeller, screw, or other rotary member receiving a fluid dynamic torque from the flowing fluid media, as the capacitive rotary speed sensor of the present invention can be used to measure the time rate of rotation of any rotating members or elements included in the mechanical, fluid handling and fluid measuring apparatus. The electrically conductive thin member included in the shroud 2 of the turbine or propeller 1 may be constructed in the form of a patch or curved plate embedded in or bonded to the shroud, wherein the patch or curved plate may extend circumferentially over a minor, a half, or a major portion of the circumference of the shroud. The frequency of the alternating electrical signal playing the role of the carrier signal may be selected to create a resonance condition providing the maximum transmission of the carrier alternating electrical signal by the capacitive electrical connection between the signal generator 8 and the amplifier 10. In order to minimize the noise, the turbine or propeller flowmeter employing the capacitive rotary speed sensor may be surrounded by a metallic enclosure encasing the dielectric wall of the conduit 4, which metallic enclosure provides an electromagnetic shielding. When the dielectric wall of the conduit 4 is encased within a metallic cylindrical shell, the dielectric wall of the conduit 4 must have a sufficient thickness providing a sizable spacing between the pair of stationary electrically conductive members 6 and 7, and the wall of the metallic cylindrical shell.

Figure 3:
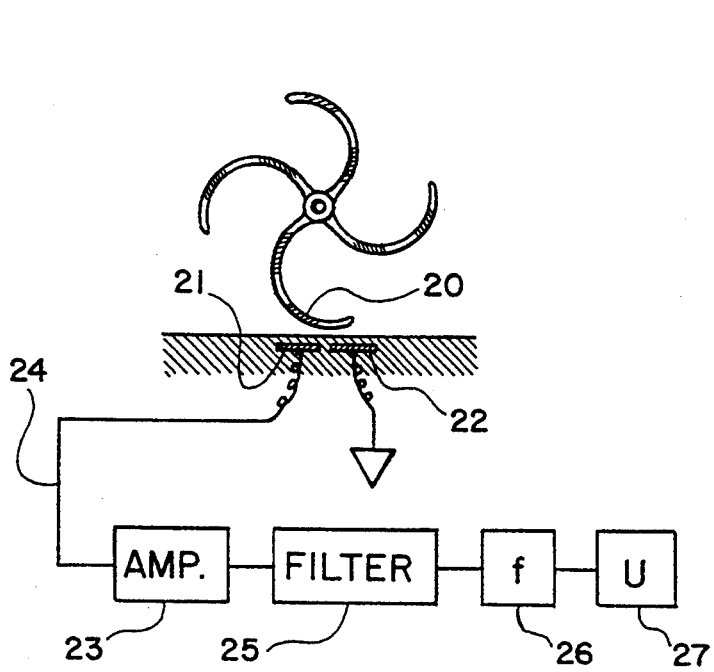
FIG. 3 illustrates an embodiment of a rotating paddle wheel or sail wheel flowmeter employing a second embodiment of the capacitive rotary speed sensor of the present invention.

In FIG. 3 there is illustrated an embodiment of a rotating paddle or sail wheel flowmeter employing another embodiment of the capacitive rotary speed sensor of the present invention. In this particular version of the capacitive rotary speed sensor, the metallic blades of the fluid dynamic rotary member having having radial extremities 20 curved into a configuration approximately tangential and closely adjacent to the pair of electrical capacitive patches or plates 21 and 22 play the same role as that of the discrete conductive members 14 and 15 rotating with the fluid dynamic rotary member 1 shown and described in conjunction with FIG. 1. One 21 of the pair of capacitive patches or plates 21 and 22 is connected to an amplifier 23 by a lead wire 24, while the other 22 of the pair of capacitive patches or plates 21 and 22 is grounded. The output alternating electrical signal from the amplifier 23 has a frequency equal to the frequency of rotation of the fluid dynamic rotary member times the number of blades included therein. As a consequence, the alternating electrical signal putout by the amplifier 23 and conditioned by an electronic filter 25 provides the frequency f thereof detected by the frequency counter 26, from which the data processor 27 determines the media velocity or the volume flow rate of media. It should be noticed that the particular embodiment of the capacitive rotary speed sensor shown in FIG. 3 results when the alternating electrical signal generator 8 and the detector 13 included in the capacitive rotary speed sensor shown in FIG. 1 are omitted. The capacitive rotary speed sensor shown in FIG. 3 works because the residual electric charges accumulated in any one of the three electrical capacitive members 20, 21 and 23 imposes a fluctuating electromotive force of a minute amplitude on the input end of the amplifier 23 as the value of the mutual capacitance between the discrete rotary capacitve member 20 and the pair of stationary capacitive members 21 and 22 fluctuates due to the intermittently changing distance therebetween during the rotation of the fluid dynamic rotary member such as the paddle or sail wheel shown in the particular illustrative embodiment, or the turbine or propeller or any other rotary member that includes one or more discrete capacitive member equivalent to the element 20 shown in FIG. 3 or elements 14 and 15 shown in FIG. 1. It should be understood that the embodiments of the capacitive rotary speed sensors shown in FIGS. 1 and 3 are interchangeable in measuring the rate of rotation of any rotary members such as a turbine, propeller, paddle or sail wheel, screw, or any other rotating mechanical members. The capacitive rotary speed sensor shown in FIG. 3 can be further simplified by omitting the grounding of the stationary capacitive member 22, or by omitting the stationary capacitive member 22 itself. Such a simplified version of the capacitive rotary speed sensor is illustrated in FIG. 4.

Figure 4:
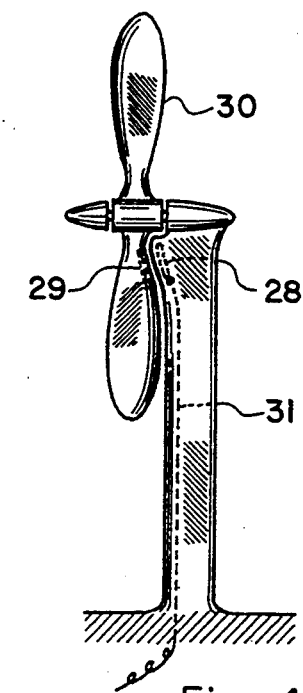
FIG. 4 illustrates an embodiment of a rotating turbine or propeller flowmeter employing a simplified version of the second embodiment of the capacitive rotary speed sensor included in the embodiment shown in FIG. 3.

In FIG. 4 there is illustrated a further embodiment of the capacitive rotary speed sensor, that comprises a single stationary capacitive member 28 constructed in the form of a metallic patch or plate, and one or more rotary capacitive member 29 provided by the metallic surface of the individual blade included in the fluid dynamic rotary member 30 such as the propeller shown in the particular illustrative embodiment, or a turbine, paddle or sail wheel. The lead wire 31 extending from the single stationary capacitive member 28 must be connected to an amplifier or a combination of an amplifier and an electronic filter as shown in FIG. 3. The stationary and rotary capacitive members 28 and 29 must intermittently establish a close surface-to-surface proximity relationship during the rotation of the fluid dynamic rotary member in order to generate a clear and loud alternating electrical signal with a frequency equal to the frequency of rotation of the fluid dynamic rotary member times the number of blades included in the fluid dynamic rotary member.

Figure 5:
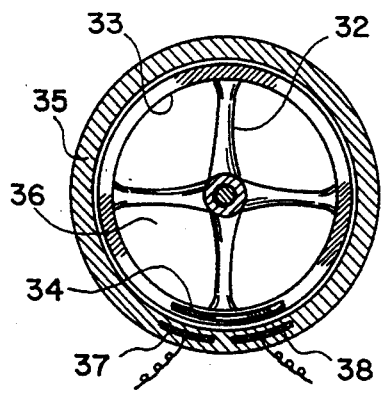
FIG. 5 illustrates another embodiment of the rotating turbine or propeller flowmeter employing a capacitive rotary speed sensor.

In FIG. 5 there is illustrated another embodiment of the turbine or propeller flowmeter employing the capacitive rotary speed sensor. The turbine or propeller 32 has a shroud 33 of a solid circular cylindrical shell geometry made of a dielectric matter such as a plastic or ceramic material. A single electrically conductive thin member constructed in the form of a patch or curved plate 34 is embedded in or bonded to the shroud 33. A dielectric wall 35 of the flow passage 36 includes a pair of stationary electrically conductive members constructed in the form of patches or curved plates 37 and 38, which are respectively connected to a signal generator and an amplifier as shown in FIG. 1. The dielectric wall 35 of the flow passage 36 may be encased in a metallic cylindrical shell to provide an added structural strength of the wall of the flow passage and the electromagnetic shielding, which encasing by the metallic cylindrical shell is not detrimental to the operation of the capacitive rotary speed sensor as long as the dielectric wall 35 has a sizable thickness that provides a sufficient spacing between the pair of stationary patches or plates 37 and 38, and the metallic cylindrical shell encasing the dielectric wall 35. The entire assembly of the turbine or propeller 32 and the shroud 33 may be made of a plastic material, or only the shroud 33 may be made of a plastic material, while the hub and blades of the turbine or propeller 32 are made of a metal. The electrically conductive patch or plate 34 may extend over a minor, a half, or a major portion of the circumference of the shroud 33.

Figure 6:
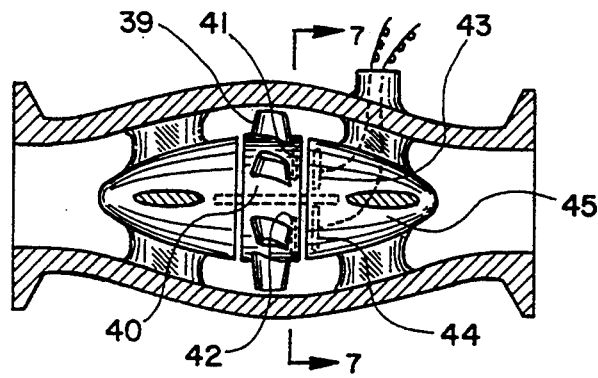
FIG. 6 illustrates a cross section of a further embodiment of the rotating turbine or propeller flowmeter employing a capacitive rotary speed sensor.

In FIG. 6 there is illustrated a cross section of a further embodiment of the turbine or propeller flowmeter employing the capacitive rotary speed sensor, which embodiment is particularly suited for constructing a highly sensitive flowmeter or one with small port sizes. The turbine 39 has a large circular cylindrical hub 40 occupying a major portion of an enlarged cross section of the flow passage. A pair of capacitive patches or plates 41 and 42 are embedded or bonded on one of the two opposite end faces of the hub 40, while a pair of stationary electrically conductive patches or plates 43 and 44 respectively connected to a signal generator or grouding terminal, and to an amplifier, are embedded in or bonded on one end face of the streamlined central core 45 rotatably supporting the hub 40 of the turbine 39, wherein the afore-mentioned end faces of the hub 40 and the central core 45 are facing one another in a close surface-to-surface proximity relationship.

Figure 7:
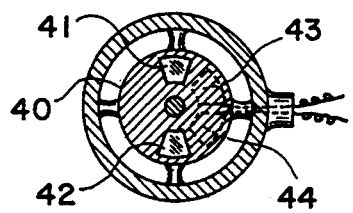
FIG. 7 illustrates another cross section of the rotating turbine or propeller flowmeter shown in FIG. 6.

In FIG. 7 there is illustrated another cross section of the turbine flowmeter shown in FIG. 6, which cross section taken along plane 7—7 as shown in FIG. 6 illustrates with a greater clarity the disposition of the pair of capacitive patches or plates 41 and 42 affixed to the hub 40 of the turbine 39, and the pair of stationary electrically conductive patches or plates 43 and 44 affixed to the central core 45, which pair of patches or plates 43 and 44 are respectively connected to a signal generator and an amplifier as shown in FIG. 1, or grounded and connected to an amplifier as shown in FIG. 3.

Figure 8:
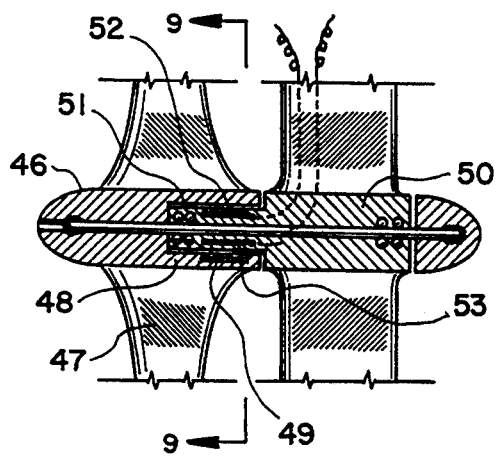
FIG. 8 illustrates yet another embodiment of the rotating turbine or propeller flowmeter employing a capacitive rotary speed sensor.

In FIG. 8 there is illustrated yet another embodiment of the turbine or propeller flowmeter employing the capacitive rotary speed sensor. The hub 46 of the turbine or propeller 47 has a hollow cylindrical portion 48 that includes an electrically conductive thin member or patch 49 disposed on a circular cylindrical surface coaxial to the axis of rotation of the turbine or propeller 47. The streamlined stationary supporting member 50 rotatably supporting the turbine or propeller 47 has a circular cylindrical extension 51 extending into the hollow cylindrical portion 48 of the hub 46, which circular cylindrical extension 51 includes a pair of stationary electrically conductive members or patches 52 and 53 disposed on a circular cylindrical surface coaxial and closely adjacent to the circular cylindrical surface including the electrically conductive thin member or patch 49. The pair of stationary electrically conductive members or patches 52 and 53 are respectively connected to a signal generator and an amplifier, or grounded and connected to an amplifier.

Figure 9:
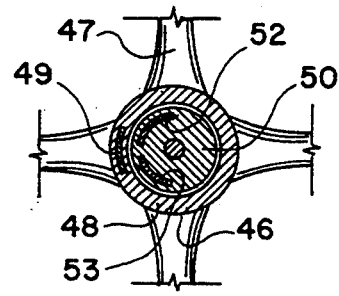
FIG. 9 illustrates a cross section of the rotating turbine or propeller flowmeter shown in FIG. 8.

In FIG. 9 there is illustrated a cross section of the turbine or propeller flowmeter shown in FIG. 8, which cross section taken along plane 9—9 as shown in FIG. 8 illustrates with a greater clarity the disposition of the electrically conductive thin member or patch 49 included in the hollow cylindrical section 48 of the hub 46 of the turbine or propeller 47, and the pair of stationary electrically conductive members or patches 52 and 53 included in the cylindrical extension 51 of the stationary supporting member 50.

Figure 10:
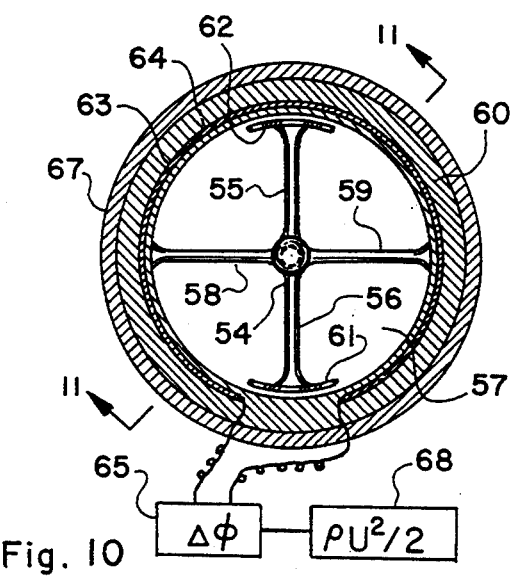
FIG. 10 illustrates a cross section of an embodiment of the nonrotating turbine or propeller flowmeter employing an embodiment of the capacitive rotary position sensor of the present invention.
Figure 12:
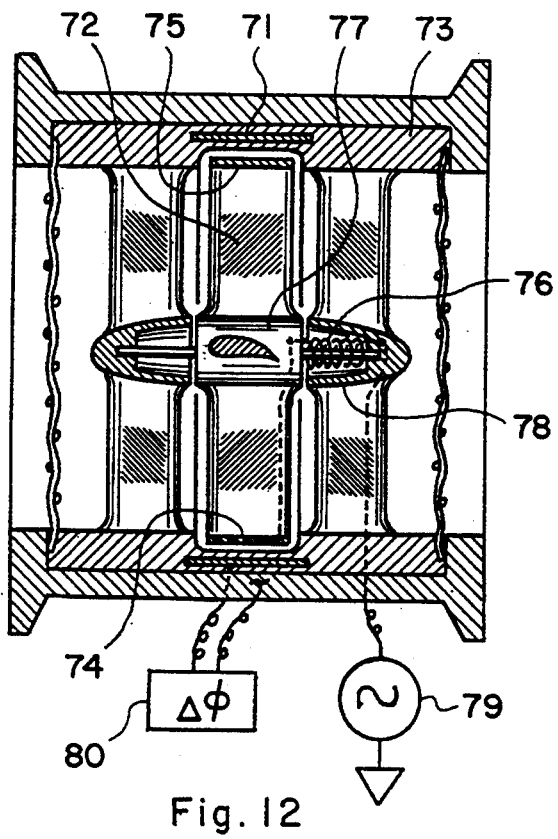
FIG. 12 illustrates a cross section of another embodiment of the nonrotating turbine or propeller flowmeter employing another embodiment of the capacitive rotary position sensor of the present invention.
Figure 13:
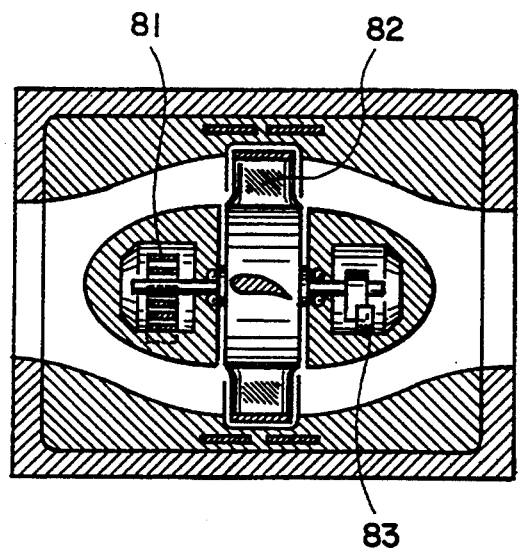
FIG. 13 illustrates a cross section of a further embodiment of the nonrotating turbine or propeller flowmeter employing a capacitive rotary position sensor.

In FIG. 10 there is illustrated a cross section of an embodiment of the nonrotating turbine or propeller flowmeter, that employs an embodiment of the capacitive rotary position sensor of the present invention. The turbine or propeller 54 including a pair of blades 55 and 56 is disposed within a flow passage 57 having a circular cross section pivotally about an axis of pivot substantially coinciding with the center line of the flow passage 57, wherein a streamlined stationary supporting member supported by a pair of planar members 58 and 59 respectively extending from two diametrically opposite portions of the dielectric wall 60, supports the turbine or propeller 54 pivotally about the center line of the flow passage 57. An electrically conductive stub member or plate 61 is disposed on a circular cylindrical surface coaxial to the center line of the flow passage 57 and fixedly secured to the tip of the blade 56 of the turbine or propeller 54, while a dielectric stub member or plate 62 is fixedly secured to the tip of the blade 55 in an arrangement providing an axisymmetric structural construction for the turbine or propeller assembly. The dielectric wall 60 of the flow passage 57 includes a pair of electrically conductive elongated members 63 and 64 (the element 64 hidden behind the element 63 in this particular view is not visible) of the geometry of a ribbon or a flat bar are disposed in a side-by-side parallel relationship circumferentially on a circular cylindrical surface coaxial and closely adjacent to the circular cylindrical surface defined by the electrically conductive stub member or plate 61 affixed to the tip of the blade 56, wherein the sizable surface area of the electrically conductive stub member or plate 61 maintains a close surface-to-surface proximity relationship with a portion of the sizable surface areas of the pair of electrically conducting elongated members 63 and 64 at all instants during pivoting movement of the turbine or propeller 54 about the center line of the flow passage 57. At least one of the pair of electrically conducting elongated members 63 and 64 has a high ohmic resistance per unit length thereof. The two opposite extremities of the first of the pair of elongated members 63 and 64 are respectively connected to two terminals of a phase angle difference measuring device 65 that measures a phase angle difference between two alternating electrical signals respectively taken off from the two opposite extremities of the first electrically conductive elongated member 63. One or both of the two opposite extremities of the second electrically conductive elongated member 64 is connected to an alternating electrical signal generator 66 that supplies an alternating electrical signal to the second electrically conductive elongated member 64. The dielectric wall 60 of the flow passage 57 is encased by a metallic cylindrical shell 67. The dielectric wall 60 must have a sizable thickness, whereby a sufficient dielectric spacing between the pair of electrically conductive elongated members 63 and 64, and the metallic cylindrical shell 67 is provided. The turbine or propeller 54 is provided with a bias torque by the weight of the electrically conductive stub member or plate 61 made of a metal, or by a bias torque spring as shown in FIG. 12 or 13, wherein the bias torque acting in a direction opposite to the direction of the fluid dynamic torque received by the turbine or propeller 54 from the flowing fluid media establishes an equilibrium rotary position for the turbine or propeller 54. Generally, the bias torque $T_B$ provided by the bias torque spring such as the element 76 shown in FIG. 12 or the element 81 shown in FIG. 13, increases linearly with the angle of rotation $\Theta$ of the turbine or propeller 54 measured from a zero angular position corresponding to zero velocity of the fluid media, $$T_B = C_S \Theta \tag{7}$$

where $C_S$ is the spring constant of the bias torque spring. The turbine or propeller 41 stays at an equilibrium angular position, whereat the fluid dynamic torque given by equation (1) and the bias torque given by equation (7) are in balance, which equilibrium condition provides the following equation:

$$\tfrac{1}{2}\rho U^2 = H\Theta \tag{8}$$

where H is a constant of proportionality to be determined empirically by calibrating the flowmeter, which constant of proportionality is defined by equation $$H = C_S/C_L \tag{9}$$

When the fluid media density is known, the media velocity U or the volume flow rate of the media is determined as a function of the angle of rotation $\Theta$ by using equation (8) or an empirical counterpart thereof. When the media velocity U is known as the result of measurement made by a volume flowmeter such as a turbine or propeller flowmeter, vortex flowmeter, differential pressure flowmeter, or other types of volume flowmeter, the mass flow rate of media as well as the density of the media is determined by using equation (8) or an empirical counterpart thereof. Experiment has shown that the rotary position $\Theta$ of the turbine or propeller 41 varies proportionally to the phase angle difference $\Delta\Phi$. As a consequence, the angular position $\Theta$ of the turbine or propeller 41 can be determined as a function of the phase angle difference $\Delta\Phi$ and then the dynamic pressure of the fluid media can be determined as a function of the angular position $\Theta$ determined from the measured phase angle difference. In other words, the dynamic pressure, or the fluid velocity, or the fluid density can be determined as a function of the phase angle difference $\Delta\Phi$ measured by the phase angle difference measuring device 65, wherein the required algorithm is carried out by a data processor 68.

Figure 11:
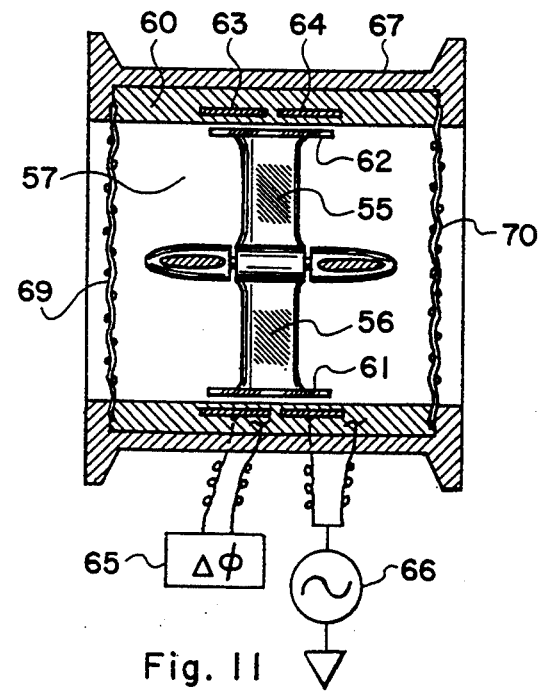
FIG. 11 illustrates another cross section of the nonrotating turbine or propeller flowmeter shown in FIG. 10.

In FIG. 11 there is illustrated another cross section of the nonrotating turbine or propeller flowmeter shown in FIG. 10, which cross section taken along plane 11—11 as shown in FIG. 10 illustrates with a greater clarity the disposition of the pair of stationary electrically conducting elongated members 63 and 64 included in and supported by the stationary dielectric wall 60 of the flow passage 57, and the electrically conductive stub member or plate 61 pivoting with the turbine or propeller 54. The phase angle difference measuring device 65 measures the phase angle difference between two alternating electrical signals respectively taken off from the two opposite extremities of the first electrically conductive elongated member 63, while the alternating electrical signal generator 66 supplies an alternating electrical signal to one or both of the two opposite extremities of the second electrically conductive elongated member 64. The assembly of the pair of electrically conductive elongated members 63 and 64, and the electrically conductive stub member 61 must be electromagnetically shielded from the ambient surroundings. The combination of the metallic cylindrical shell 67 encasing the dielectric wall 60 and a pair of wire meshes 69 and 70 respectively covering the inlet and outlet openings of the flow passage 57 provides the electromagnetic shielding. The wire meshes 69 and 70 can be omitted, when the length of the flowmeter body encased by the metallic cylindrical shell 67 is extended to a sizable distance from the cross section of the flow passage 57, including the turbine or propeller 54 in both directions. It should be understood that all lead wires extending out of the metallic cylindrical shell 67 must be electromagnetically shielded.

In FIG. 12 there is illustrated a cross section of another embodiment of the nonrotating turbine or propeller flowmeter employing another embodiment of the capacitive rotary position sensor of the present invention, that comprises a single stationary electrically elongated member 71 having a high specific ohmic resistance and a sizable surface area disposed circumferentially on a circular cylindrical surface coaxial to the axis of pivot of the turbine or propeller 72, and supported by and included in the dielectric wall 73 of the flow passage. An electrically conductive stub member or plate 74 having a sizable surface area is disposed on a circular cylindrical surface coaxial and closely adjacent to the circular cylindrical surface defined by the single electrically conductive elongated member 71, and is included in the shroud 75 of the turbine or propeller 72, which shroud 75 has a circular cylindrical shell structure coaxial to the axis of pivot of the turbine or propeller 72. The bias torque countering the fluid dynamic torque exerted on the turbine or propeller 72 by the flowing media is provided by a coil spring 76 with two opposite extremities respectively secured to the hub 77 of the turbine or propeller 72 and the streamlined central core 78 rotatably supporting the turbine or propeller 72. The bias torsion spring 76 is covered with an electrically insulating material and makes up a portion of the conductive electric circuit that transmits an alternating electrical signal from a signal generator 79 to the electrically conductive stub member or plate 74. A phase angle difference measuring device 80 measures a phase angle difference between two alternating electrical signals respectively taken off from the two opposite extremities of the single electrically conductive elongated member 71. The dynamic pressure, velocity, or density of the media moving through the flow passage is determined as a function of the measured phase angle difference. In an alternative mode of operation, the alternating electrical signal generated by the signal generator 79 may be supplied to any one of the three elements comprising the electrically conductive stub member or plate 74 and the two opposite extremities of the single electrically conductive elongated member 71, and a phase angle difference between two alternating electrical signals respectively taken off from any two of the three elements comprising the electrically conductive stub member or plate 74 and the two opposite extremities of the single electrically conductive elongated member 71 may be measured, from which phase angle difference the dynamic pressure, velocity, or density of the media is determined. In an alternative design, the alternating electrical signal generated by the signal generator 79 may be supplied to the electrically conductive stub member or plate 74 through an electric circuit that comprises a capacitor in place of the bias torque spring 76, which capacitor comprises two capacitor plates respectively included in one end face of the hub 77 of the turbine or propeller 72 and one end face of the central core 78 rotatably supporting the turbine or propeller 72, wherein the two capacitor plates are disposed in a close surface-to-surface proximity relationship therebetween.

In FIG. 13 there is illustrated a cross section of a further embodiment of the nonrotating turbine or propeller flowmeter, that is a modified version of the embodiment shown in FIG. 11, wherein the modification includes the changes parallel to those changes converting the embodiment shown in FIG. 1 to the embodiment shown in FIG. 6. In this particular illustrative embodiment, a spiral spring 81 provides the bias torque countering the fluid dynamic torque received by the turbine or propeller 82 from the flowing media, and a stop 83 prevents the turbine or propeller 82 from rotating beyond the zero angular position corresponding to zero velocity of the media. It is immediately clear that the particular embodiment of the nonrotating turbine or propeller flowmeter may employ the capacitive rotary position sensor comprising a single electrically conductive elongated member included in the embodiment shown in FIG. 12 in place of the capacitive rotary position sensor comprising the pair of electrically conductive elongated members shown in the particular illustrative embodiment. It should be understood that the nonrotating turbine or propeller flowmeters work best, when the individual blade or blades included in the nonrotating turbine or propeller has a cross section of an airfoil geometry having a constant angle of attack or pitch over the entire length of the individual blade. It should be also mentioned that the rotating as well as the nonrotating turbine or propeller flowmeters work best, when all of the electrically functioning elements included in the flowmeter are covered, lined or sheathed with a layer of electrically insulating material, whereby those elements are electrically insulated from the fluid media and other ambient surroundings.

Figure 14:
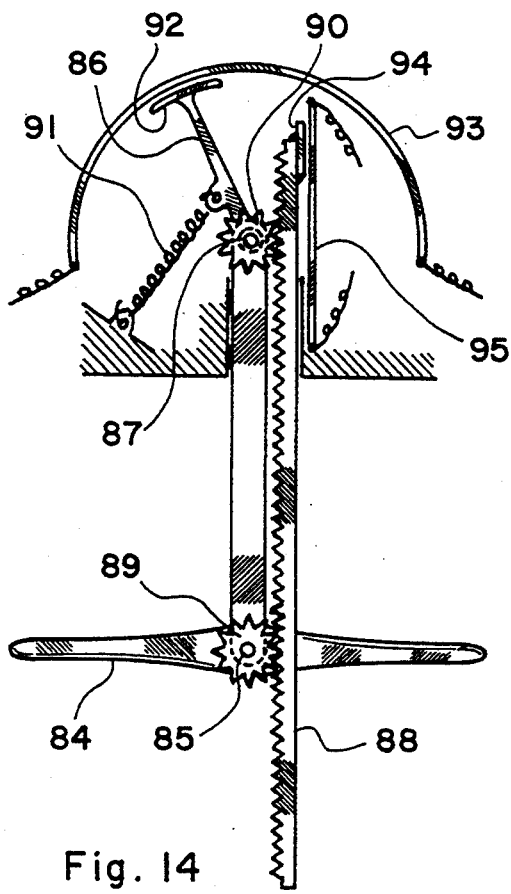
FIG. 14 illustrates yet another embodiment of the nonrotating turbine or propeller flowmeter employing a capacitive rotary position sensor.

In FIG. 14 there is illustrated yet another embodiment of the nonrotating turbine or propeller flowmeter employing a capacitive rotary position sensor. In this particular illustrative embodiment, the pivoting motion of the nonrotating turbine or propeller 84 about its pivot axis 85 is transferred to the pivoting motion of the pivoting arm 86 about its pivot axis 87 by means of the combination of a rack 88 and a pair of pinions 89 and 90 respectively affixed to the hubs of the nonrotating turbine or propeller 84 and the pivoting arm 86 in coaxial relationship. The coil spring 91 provides the bias torque countering the fluid dynamic torque experienced by the nonrotating turbine or propeller 84. The rotary position of the pivoting arm, that represents the rotary position of the nonrotating turbine or propeller 84, is determined by a capacitive rotary position sensor comprising the electrically conductive stub member 92 affixed to the radial extremity of the pivoting arm 86 and a single or a pair of stationary electrically conductive elongated members 93, which combination operates on the principles described in conjunction with either one of the two embodiments respectively shown in FIGS. 11 and 12. The dynamic pressure of the media flow is determined as a function of the rotary position of the pivoting arm 86 by using an empirically obtained mathematical relationship therebetween. In an alternative design, a capacitive linear position sensor comprising an electrically conductive stub member 94 and a single or a pair of stationary electrically conductive elongated members 95 may be employed in place of the capacitive rotary position sensor comprising the electrically conductive stub member 92 and the single or the pair of stationary electrically conductive elongated members 93 in measuring the rotary position of the nonrotating turbine or propeller 84, which capacitive linear position sensor operates on the same principles as those of the capacitive rotary position sensor described in conjunction with FIG. 11 or 12.

Figure 15:
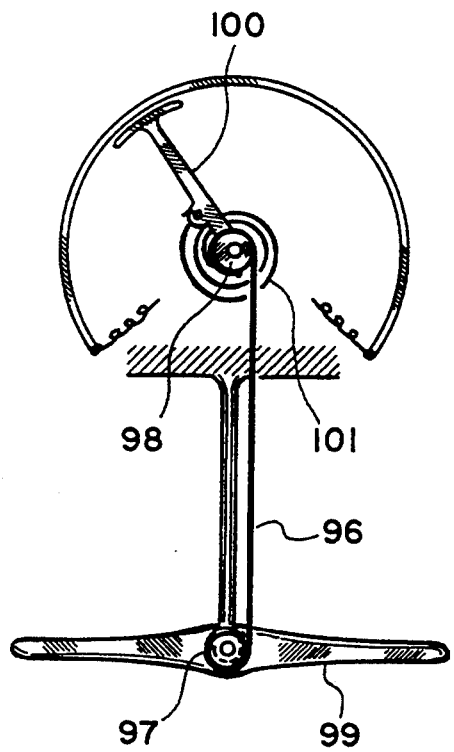
FIG. 15 illustrates yet a further embodiment of the nonrotating turbine or propeller flowmeter employing a capacitive rotary position sensor.

In FIG. 15 there is illustrated yet a further embodiment of the nonrotating turbine or propeller flowmeter employing the same capacitive rotary position sensor included in the embodiment shown in FIG. 14. This particular illustrative embodiment is a modified version of the embodiment shown in FIG. 14, that now employs a combination of a cable 96 and a pair of capstans 97 and 98 in place of the combination of the rack 88 and the pair of pinions 89 and 90 in transferring the pivoting motion of the nonrotating turbine or propeller 99 to the pivoting motion of the pivoting arm 100. The spiral coil spring 101 provides the bias torque countering the fluid dynamic torque experienced by the nonrotating turbine or propeller 99. The embodiments shown in FIGS. 14 and 15 are particularly suited for the insertion version of the nonrotating turbine or propeller flowmeter.

Figure 16:
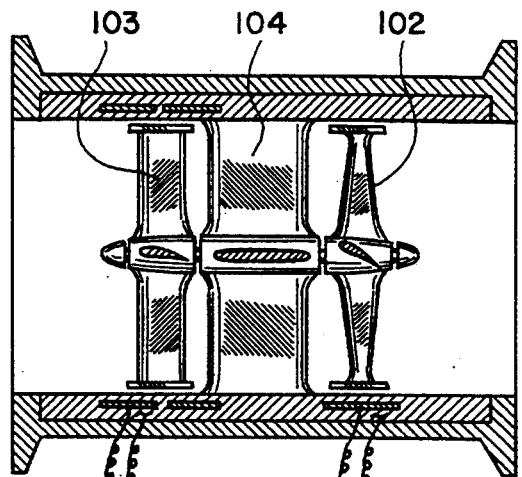
FIG. 16 illustrates a cross section of an embodiment of the multifunction or compound flowmeter comprising a series combination of the rotating turbine or propeller flowmeter and the nonrotating turbine or propeller flowmeter.

In FIG. 16 there is illustrated a cross section of an embodiment of the multi-function or compound flowmeter, that comprises a series combination of a rotating turbine or propeller flowmeter 102 and a nonrotating turbine or propeller flowmeter 103, which two flowmeters are separated from one another by a flow straightener 104 including a plurality of radially extending planar flow guides. It is generally preferable to install the nonrotating turbine or propeller flowmeter 103 upstream of the flow straightener 104 and install the rotating turbine or propeller flowmeter 102 downstream of the flow straightener 104. The velocity U or the volume flow rate of the fluid media is determined as a function of the frequency f of the output alternating electrical signal provided by the rotating turbine or propeller flowmeter 102 and the dynamic pressure $\rho U^2/2$ of the fluid media is determined as a function of the phase angle difference $\Delta \Phi$ provided by the nonrotating turbine or propeller flowmeter 103. As the mass flow rate of the fluid media is equal to two times of the ratio of the dynamic pressure to the velocity of the fluid media, and the density of the fluid media is equal to the ratio of the mass flow rate to the volume flow rate of the fluid media, the mass flow rate $\rho U$ and the density $\rho$ of the fluid media are determined as functions of the frequency f provided by the rotating turbine or propeller flowmeter and the phase angle difference $\Delta \Phi$ provided by the nonrotating turbine or propeller flowmeter. The particular illustrative embodiment provides a highly economic three-in-one flowmeter that determines the mass and volume flow rates of a fluid media having a variable or unknown density as well as the density of the fluid media.

Figure 17:
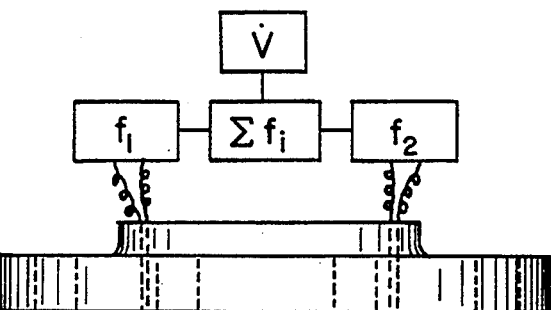
FIG. 17 illustrates a cross section of another embodiment of the multifunction or compound flowmeter.
Figure 17:
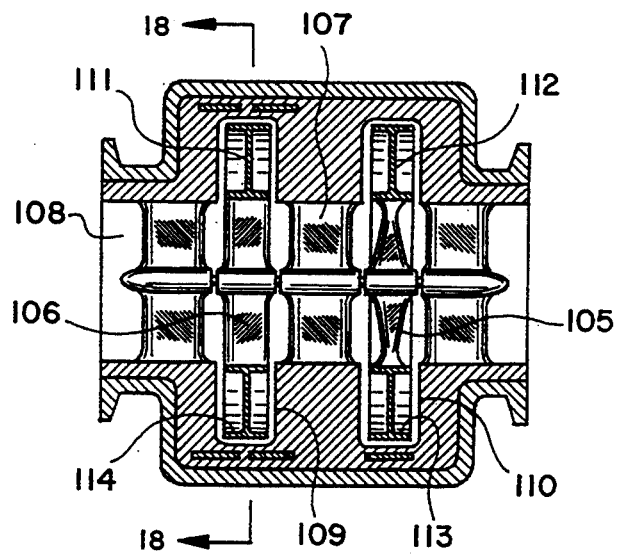

In FIG. 17 there is illustrated a cross section of another embodiment of the multi-function or compound flowmeter comprising a series combination of a rotating turbine or propeller flowmeter 105 and a nonrotating turbine or propeller flowmeter 106 separated from one another by a flow straightener 107, which embodiment is particularly suited for the construction of the three-in-one flowmeters of small port sizes. The flow passage 108 includes two radially enlarged sections 109 and 110 respectively accommodating the nonrotating turbine or propeller 106 with a radially extended shroud 111, and the rotating turbine or propeller 105 with a radially extended shroud 112. The electrically conductive thin member included in the capacitive rotary speed sensor of the rotating turbine or propeller flowmeter 105 is included in the outer circular cylindrical shell 113 of the shroud 112 of the rotating turbine or propeller 105, while the electrically conductive stub member included in the rotary position sensor of the nonrotating turbine or propeller flowmeter 106 is included in the outer circular cylindrical shell 114 of the shroud 111 of the nonrotating turbine or propeller 106.

Figure 18:
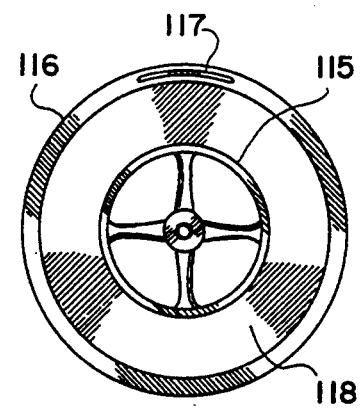
FIG. 18 illustrates an end view of the rotating or nonrotating turbine or propeller included in the multi-function or compound flowmeter shown in FIG. 17.

In FIG. 18 there is illustrated an end view of the rotating or nonrotating turbine or propeller included in the multi-function or compound flowmeter shown in FIG. 17. The assembly of the hub and blades are fitted within the inner circular cylindrical shell 115 of the shroud assembly and the extremities of the individual blades are fixedly secured to the inner circular cylindrical shell 115. The annular planar member 118 structurally joins the inner and outer circular cylindrical shells 115 and 116 to one another. The outer circular cylindrical shell 116 includes the electrically conductive thin member or stub member 117. The diameter of the inner circular cylindrical shell 115 is matched to the diameter of the unaltered portion of the flow passage, while the diameter of the outer circular cylindrical shell 116 is matched to the diameter of the radially enlarged section of the flow passage.

Figure 19:
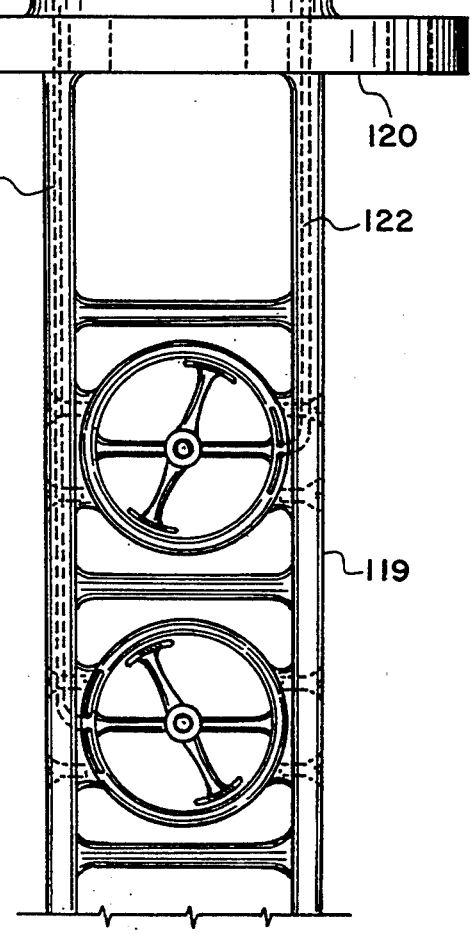
FIG. 19 illustrates an embodiment of the insertion type flowmeter comprising one or more rotating turbines or propellers, or one or more nonrotating turbines or propellers, or one or more combinations of the rotating turbine or propeller and the nonrotating turbine or propeller.

In FIG. 19 there is illustrated an embodiment of the insertion type flowmeter comprising one or more of the rotating turbines or propellers, or one or more of the nonrotating turbines or propellers, or one or more of the series combinations of a rotating and a nonrotating turbine or propeller flowmeter. One or more of the individual flowmeters are supported by an elongated structural member 119 extending from an anchoring flange 120. The elongated structural member 119 including one or more of the individual flowmeters extend through a hole disposed through the wall of a conduit or pipe and into the flow passage inside of the conduit or pipe, while the anchoring flange 120 is secured to a matching flange affixed to the wall of the conduit or pipe. The lead wires 121 and 122 extending from the individual flowmeters rigidly mounted on the elongated structural member 119 are routed through holes or grooves included in the elongated structural member 119 and out of the outside face of the anchoring flange 120. The flow rate of the fluid media moving through the flow passage inside of the conduit or pipe is determined from a sum or averaged value of the data provided by the individual flowmeters. For example, the volume flow rate $\dot{V}$ of the fluid media is determined from the sum or averaged value of the frequencies $f_1$, $f_2$, etc. respectively provided by the individual rotating turbine or propeller flowmeters. The advantage provided by the packaging of the capacitive rotary speed and position sensor of the present invention into a thin streamlined structural assembly is immediately appreciated, when the particular construction of the insertion type flowmeter shown in FIG. 19 is examined, for the conventional rotating turbine or propeller flowmeter employing the magnetic induction or magnetic reluctance rotary speed sensor cannot be assembled into a highly streamlined structure exemplified by the insertion type flowmeter shown in FIG. 19.

While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring flow rate of media comprising in combination:
   a) a rotary member disposed in a flow stream of fluid media rotatably about an axis of rotation, wherein flow of the fluid media exerts a fluid dynamic torque on the rotary member and rotates the rotary member about the axis of rotation;
   b) at least one first discrete electrically conductive member having a substantially continuous single first surface of a sizable area and rotating with the rotary member about the axis of rotation, said first surface coinciding with a hypothetical surface defined by rotation of a line of intersection between the first surface and a plane including the axis of rotation about the axis of rotation;
   c) a second and third discrete electrically conductive member respectively having a second and third surface of sizable area, said second and third surfaces disposed in a side-by-side relationship to one another in a stationary manner on a surface substantially coaxial and closely adjacent to said hypothetical surface, wherein the first surface of the first discrete electrically conductive member intermittently establishes a surface-to-surface proximity relationship commonly with the second and third surfaces of the second and third discrete electrically conductive members during rotation of the rotary member about the axis of rotation, whereby the first discrete electrically conductive member establishes an intermittent capacitive electrical coupling between the second and third discrete electrically conductive members once every rotation of the rotary member about the axis of rotation;
   d) means for conditioning a fluctuating electrical signal taken off from one of the second and third discrete electrically conductive members; and
   e) means for measuring frequency of fluctuation of a conditioned form ~ of the fluctuating electrical signal as a measure of flow rate of the media.

2. An apparatus as defined in claim 1 wherein said combination includes means for determining volume flow rate of the fluid media as a function of the frequency of the conditioned form of the fluctuating electrical signal.

3. An apparatus as defined in claim 1 wherein an alternating electrical signal generator supplies an alternating electrical signal to the other of the second and third discrete electrically conductive members.

4. An apparatus as defined in claim 3 wherein said means for conditioning conditions the fluctuating electrical signal into a conditioned form of the fluctuating electrical signal representing an amplitude modulation of the fluctuating electrical signal created by the rotation of the rotary member.

5. An apparatus as defined in claim 4 wherein said combination includes means for determining volume flow rate of the fluid media as a function of the frequency of the conditioned form of the fluctuating electrical signal.

6. An apparatus as defined in claim 1 wherein the other of the second and third discrete electrically conductive members is grounded.

7. An apparatus as defined in claim 6 wherein said means for conditioning conditions the fluctuating electrical signal into a conditioned form of the fluctuating electrical signal representing an amplitude modulation of the fluctuating electrical signal created by the rotation of the rotary member.

8. An apparatus as defined in claim 7 wherein said combination includes means for determining volume flow rate of the fluid media as a function of the frequency of the conditioned form of the fluctuating electrical signal.

9. An apparatus for measuring flow rate of media comprising in combination:
   a) a rotary member disposed in a flow stream of fluid media rotatably about an axis of rotation, wherein flow of the fluid media exerts a fluid dynamic torque on the rotary member and rotates the rotary member about the axis of rotation;
   b) at least one first discrete electrically conductive member having a first surface of a sizable area and rotating with the rotary member about the axis of rotation, said first surface substantially coinciding with a hypothetical surface defined by rotation of a line of intersection between the first surface and a plane including the axis of rotation about the axis of rotation;
   c) a second and third discrete electrically conductive member respectively having a second and third surface of sizable area, said second and third surfaces disposed in a stationary manner on a surface substantially coaxial and closely adjacent to said hypothetical surface, wherein the first surface of the first discrete electrically conductive member intermittently establishes a surface-to-surface proximity relationship commonly with the second and third surfaces of the second and third discrete electrically conductive members during rotation of the rotary member about the axis of rotation; whereby the first discrete electrically conductive member establishes an intermittent capacitive electrical coupling between the second and third discrete electrically conductive members during the rotation of the rotary member;
   d) means for obtaining an output electrical signal representing an amplitude modulation created by the rotation of the rotary member about the axis of rotation from a fluctuating electrical signal taken off from one of the second and third discrete electrically conductive members; and e) means for measuring frequency of the output electrical signal as a measure of volume flow rate of the fluid media.

10. An apparatus as defined in claim 9 wherein said combination includes means for determining volume flow rate of the fluid media as a function of the frequency of the output electrical signal.

11. An apparatus as defined in claim 9 wherein an alternating electrical signal generator supplies an alternating electrical signal to the other of the second and third discrete electrically conductive members.

12. An apparatus as defined in claim 11 wherein said combination includes means for determining volume flow rate of the fluid media as a function of the frequency of the output electrical signal.

13. An apparatus as defined in claim 9 wherein the other of the second and third discrete electrically conductive members is grounded.

14. An apparatus as defined in claim 13 wherein said combination includes means for determining volume flow rate of the fluid media as a function of the frequency of the output electrical signal.

* * * * *